UNITED STATES PATENT OFFICE.

GURDON CONKLING, OF GLENS FALLS, NEW YORK.

COMPOSITION OF MATTER AND PROCESS OF PREPARING COMMINUTED IRON ORE.

SPECIFICATION forming part of Letters Patent No. 468,219, dated February 2, 1892.

Application filed April 11, 1891. Serial No. 388,572. (No specimens.)

*To all whom it may concern:*

Be it known that I, GURDON CONKLING, a citizen of the United States, residing at Glens Falls, in the county of Warren and State of New York, have invented new and useful Improvements in Composition and Process of Preparing Comminuted Iron Ore for Transportation and for Furnace Use, of which the following is a specification.

This invention relates to a new composition of matter and to a new process of preparing comminuted iron ore for transportation and for furnace use.

In carrying out my invention I take commercial muriatic acid which varies in strength from 18° to 20° Baumé, and to this muriatic acid I add slowly magnesium oxide until the acid has become neutralized. During this operation the liquid should be kept cool, since the reaction has a tendency to raise the temperature. The liquid obtained by this reaction is a solution of magnesium chloride of from 30° to 35° Baumé. I then mix one pound of this liquid with about eight pounds of magnesium oxide, and of this compacting mixture I take about two pounds and mix them with ninety-eight pounds of finely-comminuted iron ore, which may be rendered sufficiently moist by the addition of water to form a thoroughly-dampened mass, which, after having been thoroughly mixed, can be readily formed into lumps or bricks of convenient size for handling and for furnace use. These lumps are left standing until they become hard, and by these means the comminuted iron ore is brought into such a condition that it can be readily transported, and, furthermore, the lumps when introduced into a blast-furnace are not liable to crumble to pieces until they have dropped so far in their natural descent to the point of heat in the furnace which causes fusion, so that the finely-comminuted iron ore contained in the bricks or lumps is not liable to be blown out of the stack into the flues.

From the foregoing description it will be seen that the weight of the comminuted iron ore when compacted into hard lumps or bricks according to my invention is increased only about two per cent.—that is to say, by the addition of the compacting mixture the weight of a ton of iron ore is increased about forty-five pounds, so that the cost of handling and of transportation is increased very little, and, furthermore, the lumps or bricks formed according to my invention consist of iron ore mixed with an excellent flux, thereby producing the maximum amount of iron with the minimum amount of fuel, flux, and labor.

What I claim as new, and desire to secure by Letters Patent, is—

1. A hard lump or brick composed of comminuted iron ore, magnesium oxide, and magnesium chloride, substantially as described.

2. The process of forming lumps or bricks, which consists in mixing comminuted iron ore with a solution of magnesium chloride and with magnesium oxide, then forming or pressing the mixture into lumps or bricks of convenient size, and finally allowing these lumps or bricks to harden, substantially as described.

In testimony whereof I have hereunto set my hand in the presence of two subscribing witnesses.

G. CONKLING.

Witnesses:
WM. C. HAUFF,
W. HAUFF.